T. PIERSON.
FIRELESS COOKER.
APPLICATION FILED FEB. 9, 1909.
983,565.
Patented Feb. 7, 1911.
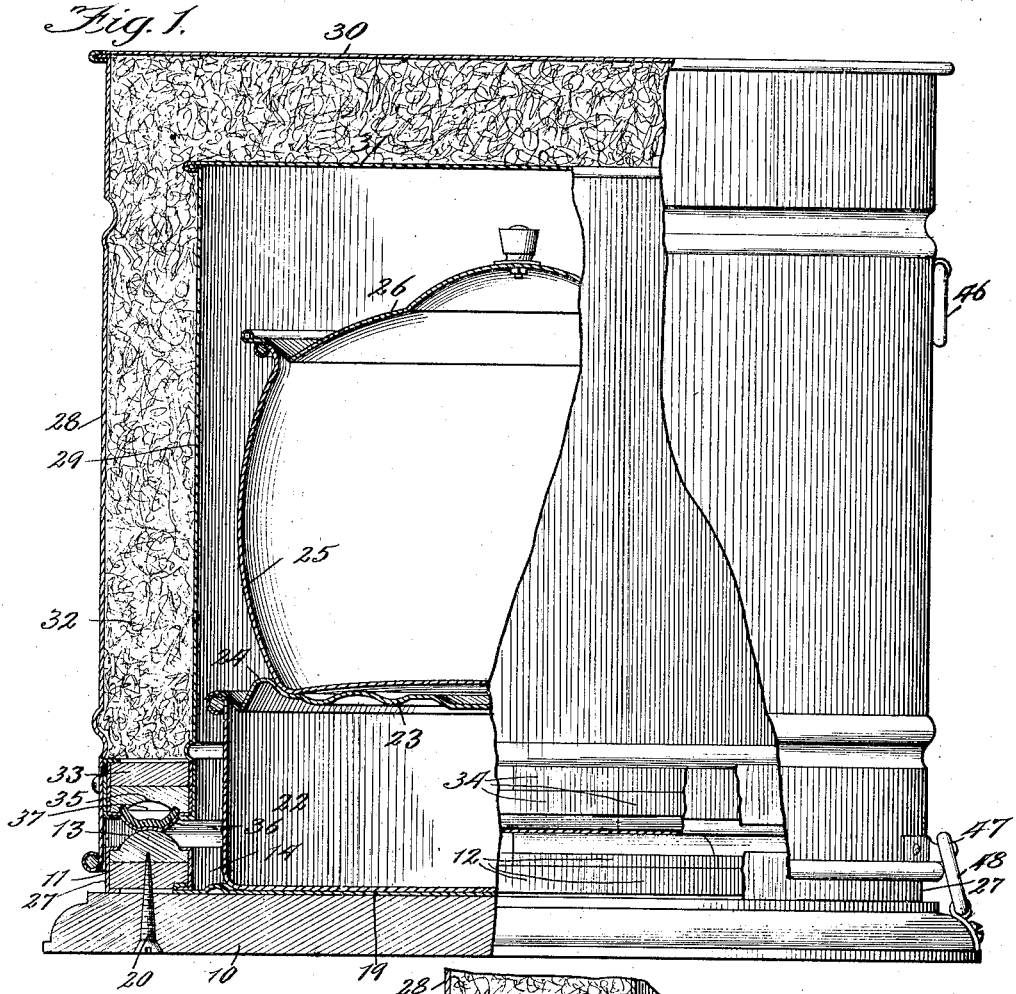
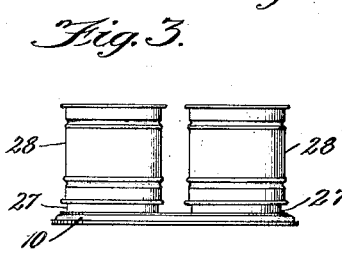
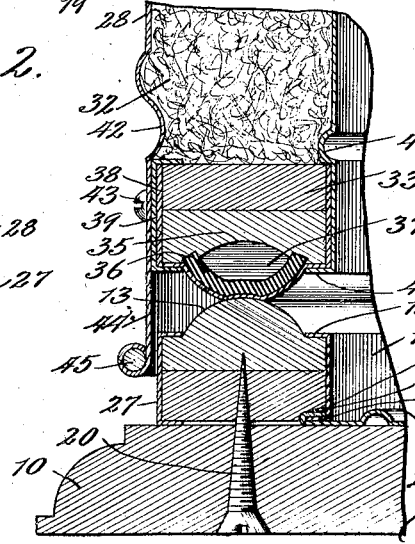
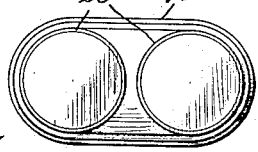

UNITED STATES PATENT OFFICE.

THERON PIERSON, OF CHICAGO, ILLINOIS, ASSIGNOR TO EVA PIERSON, OF CHICAGO, ILLINOIS.

FIRELESS COOKER.

983,565.      Specification of Letters Patent.      Patented Feb. 7, 1911.

Application filed February 9, 1909. Serial No. 476,897.

*To all whom it may concern:*

Be it known that I, THERON PIERSON, a citizen of the United States, and a resident of Chicago, in the county of Cook and State of Illinois, have invented certain new and useful Improvements in Fireless Cookers, of which the following is a full, clear, and exact specification.

My invention is concerned with an improved "fireless cooker", a name given to cooking utensils which are especially constructed to insulate an internal chamber or chambers therein from the external cold or heat, so that partially cooked food, raised to a cooking heat, will retain its heat long enough to complete the cooking, thus saving on the fuel consumed, and which can also be employed to keep cooked vituals hot or frozen or chilled vituals cold, for a long time, and is designed to produce a device of the class described, which shall be extremely efficient, and which can be properly constructed to secure great durability under the trying conditions of use in which these devices are employed.

To this end, my improved fireless cooker embodies certain novel combinations and features of construction which will be described in detail in the body of the specification and particularly pointed out in the claims.

To illustrate my invention I annex hereto a sheet of drawings, in which the same reference characters are used to designate identical parts in all the figures, of which,—

Figure 1 is a front elevation of a cooker embodying my invention, with a portion thereof in central vertical section, and with other portions broken away to show the construction; Fig. 2 is an enlarged detail of a portion as shown in Fig. 1; Fig. 3 is a side elevation showing two cookers, like that of Fig. 1, mounted on a common base but otherwise separated, so that one portion could be used for cooking while the other is used for refrigeration; and Fig. 4 is a top plan view of the construction shown in Fig. 3.

While I may construct my cooker of any desired shape in horizontal cross section, such as circular, triangular, square, rectangular, etc., to accommodate any desired arrangement or shape of the cooking vessels employed, I preferably make it circular in horizontal cross section, as shown in Fig. 1.

I preferably connect the side walls with the top, so that by lifting off the top portion from the base, the cooking utensils are left substantially entirely exposed so that they can be taken hold of at any part thereof conveniently, and so that they can be placed one above another, which cannot be so readily done if the side walls are attached to the base.

I construct the base 10 of a disk of some suitable heat insulating material, such as wood, prepared fiber, or any other desired substance, and around the edge of the base 10 I provide a rim 11, which is, of course, adjacent the edge of the base and conforms to the general outline thereof, being of course an annulus where the cooker is circular in horizontal cross section.

As indicated in Fig. 1, this rim 11 is preferably built up of segmental pieces 12, which are overlapped so as to break joints in the manner shown and are glued or otherwise rigidly secured together in any desired manner. The top of this rim is provided with the convex bearing surface 13, and as the condensed steam from the cooking would tend to get into the joint between the rim 11 and the base 10, I preferably line the base and the rim, by providing the metal lining strip 14 which is preferably of zinc, and has the inwardly turned flange 15 at its top and the inwardly turned flange 16 at its bottom, the top flange 15 turning over the corner and extending to the convex curved surface 13 and the flange 16 turning over the bottom edge and extending into a recess 17 formed in the wood, and into the hook 18 formed by an inwardly turned flange on the sheet metal disk 19 secured on the top of the base. By means of the screws 20 passed through the base into the rim 11 and the arrangement shown of the flanges 16 and 18, the metal strip 14 and the disk 19 are securely fastened in position.

The disk 19 is preferably provided with the upwardly extended bead 21 which serves to center the lower cooking utensil 22 therein. I preferably provide this utensil 22 with a cover 23, which is preferably corrugated for strength, and is provided with the upwardly extended bead 24 which serves as a guide and holder for centering the second utensil 25 adapted to be placed on top of the first utensil and which is provided with a cover 26 as shown.

The outer side of the rim 11 is provided with a covering strip 27, similar to the strip 14, as will be readily apparent. The cover is preferably made of the two parallel sheet metal cylinders 28 and 29, which are preferably composed of aluminum, which is light, and does not tarnish readily, and have their upper ends closed by the disks 30 and 31 of similar material, which are secured thereto by the outwardly turned flanges on the walls and the inwardly turned flanges on the tops in a manner which will be readily apparent. The space between the two cylinders, which is considerable, may be left for a dead air space, or may be filled with some suitable material 32, such as asbestos, cork or any other well known heat insulating material. The cover is likewise provided with the rim 33, which is constructed of some material, such as wood, similar to the rim 11, and like it is preferably made up of overlapped segmental portions 34 which are permanently secured together.

The lower or bearing surface of the rim 33 has the concavity 35 which is covered by the convex strip 36 of rubber, or some similar elastic water-proof material, arranged so as to leave an air space 37 between the rim 33 and the cushion strip 36. The object of this strip 37 with the air space is to form an elastic air tight cushion between the cover and the base which will yield under the weight of the cover so as to make a perfectly air tight and heat insulating joint between the two parts of the cooker. To hold the strip 36 in place, I preferably employ a layer or strip 38 of some suitable flexible covering material, such as oil cloth, which, in turn, is held on the rim 33 by the strip 39 on its outer side having the inturned flanges like those of the strip 27, and on its inner side by the inwardly extended bead 40 of the wall 29 and the inwardly projecting flange 41 constituting the bottom edge of the wall 29.

It will be seen that the bead 40 and the flange 41 not only serve to secure the layer 38 in place but also to position the rim 33 and hold it in place. The positioning of the rim 33 is also aided by the bead 42 in the outer wall 28, and the rim 33 is preferably finally secured to the wall 28 by a plurality of screws 43 extending through the wall 28, metallic strip 39 and layer 38 into the rim 33. The wall 28 is preferably provided with the extension 44 reaching below the joint and conveniently reinforced by the wire 45 in a manner which is customary to sheet metal vessels.

The cover may be provided with handles 46, and with lugs 47, with which the fastening links 48, secured to the base 10, coöperate to secure the cover to the base.

In Figs. 3 and 4 I have shown an elongated base member provided with two rims adapted to receive two separate covers, so that the two insulated spaces are entirely separate, so that one might be used for cooking, while the other is simultaneously used for refrigeration if desired.

While I have shown and described my invention as embodied in the form which I consider best adapted to carry out its purposes, it will be understood that it is capable of some modifications, and that I do not desire to be limited in the interpretation of the following claims except as may be necessitated by the state of the prior art.

What I claim as new, and desire to secure by Letters Patent of the United States, is,—

1. In a fireless cooker, the combination with a heat insulating base member provided with an engaging surface, of a heat insulating cover member having a complementary engaging surface, one of said surfaces being convex and the other concave, and a yielding cushion between said surfaces composed of a strip of air tight flexible material having its outer face convex and secured to the aforesaid concave surface to form a heat insulating air cushion between the two surfaces, substantially as described.

2. In a fireless cooker, the combination with a heat insulating base member provided with an engaging surface, of a heat insulating cover member having a complementary engaging surface, one of said surfaces being convex and the other concave, and a yielding cushion between said surfaces composed of a strip of rubber having its outer face convex and secured to the aforesaid concave surface to form a heat insulating air cushion between the two surfaces, substantially as described.

3. In a fireless cooker, the combination with a heat insulating base provided with a rim having a convex engaging surface, of a heat insulating cover provided with a rim having a concave engaging surface complementary to the surface on the base rim, and a yielding cushion between said surfaces composed of a strip of air tight flexible material having its outer face convex and secured to the aforesaid concave surface to form a heat insulating air cushion between the two surfaces, substantially as described.

4. In a fireless cooker, the combination with a heat insulating base provided with a rim having a convex engaging surface, of a heat insulating cover provided with a rim having a concave engaging surface complementary to the surface on the base rim, and a yielding cushion between said surfaces composed of a strip of rubber having its outer face convex and secured to the aforesaid concave surface to form a heat insulating air cushion between the two surfaces, substantially as described.

5. A fireless cooker comprising two concentric metallic walls, and a member of rigid insulating material connecting the edges of said walls, the inner wall having an inturned bead and an inturned flange for positioning said securing member, substantially as described.

6. A fireless cooker comprising two concentric metallic walls and a member of rigid insulating material connecting the edges of said walls, said walls having the inturned beads and the inner wall having an inturned flange for positioning and securing said member, substantially as described.

7. A fireless cooker comprising two concentric metallic walls, and a member of rigid insulating material connecting the edges of said walls, said member having a concave surface, a strip of air tight flexible material having its outer face convex over said concave surface, a layer of covering material over the flexible material and the sides of the member, and means for securing said member and the layer between the walls, substantially as described.

8. A fireless cooker comprising two concentric metallic walls, a member of rigid insulating material connecting the edges of said walls, said member having the concave surface, a strip of air tight flexible material having its outer face convex over said concave surface, and a layer of covering material over the flexible material and the sides of the member, said walls having the inturned beads and the inner wall having an inturned flange for positioning and securing said member and the layer of covering material, and screws connecting the outer wall and the member of the insulating material, substantially as described.

9. A fireless cooker comprising two concentric metallic walls, a member of rigid insulating material connecting the edges of said walls, said member having the concave surface, a strip of air tight flexible material having its outer face convex over said concave surface, a layer of covering material over the flexible material and the sides of the member, a metallic strip with an inturned flange between the outer wall and the insulating member, said walls having the inturned beads and the inner wall having an inturned flange for positioning and securing said insulating member and the layer of covering material, and screws passing through the outer wall, the metallic strip and layer of covering material into the insulating member, substantially as described.

10. A fireless cooker comprising a base of heat insulating material having an upward projecting rim resting thereon, a metallic strip covering the inner wall of the rim, and having its lower edge turned into a recess in the rim and a metallic covering sheet for the top of the base having the hooked edge extending into the recess and engaged by the inturned edge of the strip to lock the metal parts in place, substantially as described.

11. A fireless cooker comprising a base of heat insulating material having an upward projecting rim resting thereon, a metallic strip covering the inner wall of the rim, and having its lower edge turned into a recess in the rim and a metallic covering sheet for the top of the base having the hooked edge extending into the recess and engaged by the inturned edge of the strip to lock the metal parts in place and formed with the positioning rib thereon, substantially as described.

In witness whereof, I have hereunto set my hand and affixed my seal, this 29th day of January, A. D. 1909.

THERON PIERSON. [L. S.]

Witnesses:
JOHN HOWARD McELROY,
R. J. JACKER.